US009108512B2

(12) United States Patent
Imafuku

(10) Patent No.: US 9,108,512 B2
(45) Date of Patent: Aug. 18, 2015

(54) TRANSFER DEVICE

(75) Inventor: Mizuki Imafuku, Kariya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/366,305

(22) PCT Filed: Dec. 22, 2011

(86) PCT No.: PCT/JP2011/007198
§ 371 (c)(1),
(2), (4) Date: Jun. 18, 2014

(87) PCT Pub. No.: WO2013/093978
PCT Pub. Date: Jun. 27, 2013

(65) Prior Publication Data
US 2014/0336001 A1    Nov. 13, 2014

(51) Int. Cl.
*B60K 23/08* (2006.01)
*B60K 17/346* (2006.01)
*B60K 17/35* (2006.01)

(52) U.S. Cl.
CPC ............... *B60K 23/08* (2013.01); *B60K 17/346* (2013.01); *B60K 17/35* (2013.01); *B60K 23/0808* (2013.01); *B60K 2023/0816* (2013.01); *B60K 2023/0841* (2013.01); *B60K 2023/0858* (2013.01); *B60K 2023/0866* (2013.01); *Y10T 477/606* (2015.01)

(58) Field of Classification Search
CPC ...... B60K 23/08; B60K 17/346; B60K 17/35; B60K 23/0808; B60K 2023/0841; B60K 2023/0858; F16D 13/00; F16D 15/00; F16D 28/00
USPC ............ 701/69; 475/220, 221, 222, 223, 230, 475/225
See application file for complete search history.

(56) References Cited

U.S. PATENT DOCUMENTS

| 5,215,160 | A | * | 6/1993 | Williams et al. | 180/197 |
|---|---|---|---|---|---|
| 5,275,252 | A | * | 1/1994 | Sperduti et al. | 180/197 |
| 5,275,253 | A | * | 1/1994 | Sperduti et al. | 180/197 |
| 5,651,749 | A | * | 7/1997 | Wilson et al. | 475/221 |
| 7,004,875 | B2 | * | 2/2006 | Williams et al. | 475/198 |
| 7,175,558 | B2 | * | 2/2007 | Puiu et al. | 475/225 |
| 7,278,946 | B2 | * | 10/2007 | Williams et al. | 475/198 |
| 2010/0192724 | A1 | * | 8/2010 | Mohan | 74/665 F |

FOREIGN PATENT DOCUMENTS

| JP | 63-13332 | 1/1988 |
|---|---|---|
| JP | 2010-6326 | 1/2010 |

* cited by examiner

*Primary Examiner* — David J Hlavka
(74) *Attorney, Agent, or Firm* — Finnegan, Henderson, Farabow, Garrett & Dunner, LLP

(57) ABSTRACT

A transfer device capable of performing switching between a two-wheel drive mode or a standby four-wheel drive mode and a full-time four-wheel drive mode is provided with: a center differential which comprises a differential mechanism including one side gear coupled to rear wheels and the other side gear capable of transmitting power to a spline piece coupled to front wheels, and a differential case coupled to an engine; a switching sleeve which is movable between a first position at which the differential case and a hub are engaged and a second position at which the hub and the spline piece are engaged; and a control clutch which engages and disengages a rear wheel output shaft coupled to the one side gear and the spline piece.

7 Claims, 7 Drawing Sheets

TRANSFER DEVICE

CROSS-REFERENCE TO RELATED APPLICATIONS

This application is a national phase application of International Application No. PCT/JP2011/007198, filed Dec. 22, 2012, the content of which is incorporated herein by reference.

TECHNICAL FIELD

The present invention relates to a transfer device, and more particularly to a transfer device to be mounted on a four-wheel drive vehicle which can be switched to selectively take a two-wheel drive state or a four-wheel drive state.

BACKGROUND ART

Conventionally, there has been known a four-wheel drive vehicle constituted by an FR (front engine rear drive) of a vertically installed engine type as one of four-wheel engine vehicles which can be switched between a two-wheel drive state and a four-wheel drive state. The four-wheel drive vehicle as previously mentioned is generally constructed to include a center differential for absorbing the rotational difference between front wheels and rear wheels while travelling in the four-wheel drive state, and a switching mechanism capable of switching the two-wheel drive state and the four-wheel drive state.

As one of transfer devices of this kind, there has been known a transfer device which comprises a center differential having a deferential case connected with an output shaft of a transmission, one side gear connected with a rear drive shaft, and the other side gear connected with an output member forming part of a front wheel drive system, and a switching mechanism juxtaposed with the center differential (see for example Patent Document 1).

The switching mechanism disclosed in the Patent Document 1 has a sleeve which is spline-engageable with splines respectively formed on the outer peripheral portion of the differential case, on the outer peripheral portion of an output member and on the outer peripheral portion of a drive member capable of transmitting power to a front wheel drive shaft, and which is axially movable. The above sleeves can axially be moved by the operation of a driver, thereby making it possible to selectively switch the engagement states with the splines, and thus can take three positions as follows. The positions include a first position where the sleeve is in the engagement state with the spline of the differential case and the spline of the output member, a second position where the sleeve is in the engagement with the spline of the output member and the spline of the drive member by the movement of the sleeve toward the drive member from the first position, and a third position where the sleeve is in the engagement state with the above three splines by the further movement of the sleeve toward the drive member from the second position.

At the first position, the rotation of the differential case is not transmitted to the drive member, so that the transfer device takes the two-wheel drive state in which the front wheel is not driven while only the rear wheel is driven. At the second position, the rotation of the other side gear is transmitted to the drive member, so that the transfer device takes the four-wheel drive state in which the front wheel and the rear wheel are driven. At this time, the differential case and the output member are not fixed through the sleeve, so that the transfer device takes a differential free state in which the center differential can absorb the rotational difference between the front and rear wheels. At the third position, the rotation of the differential case is transmitted to the drive member, so that the transfer device takes the four-wheel drive state in which the front wheels and the rear wheels are driven. At this time, the differential case is fixed to the output member, so that the power inputted from the transmission is directly transmitted to the drive member through the differential case but not through the other side gear. This means that at the third position, the rotational difference between the front and rear wheels is not absorbed by the center differential, viz., the transfer device takes a differential lock state.

CITATION LIST

Patent Literature

Patent Document 1: Japanese Published Unexamined Utility Model Application No. 63-13332

SUMMARY OF INVENTION

Technical Problem

However, the conventional transfer device disclosed in the Patent Document 1 is constructed to take such a differential lock state in which the sleeve is engaged with all of three splines although this sleeve engagement is temporal when the switching operation is performed for example from the two-wheel drive state to the four-wheel drive state, viz., when the sleeve is moved from the first position to the second position. In the differential lock state, the torsion generated between the rear wheel drive shaft and the front wheel drive shaft cannot be absorbed by the center differential, so that the torsional torque generated from the tire diameter difference of the front and rear wheels which is so called a circulating torque is accumulated in the elements of the transfer device. Therefore, in the conventional transfer device, the sleeve is difficult to be moved by the above circulating torque. This means that the conventional transfer device encounters such a problem that the switching operation from the two-wheel drive state to the four-wheel drive state cannot be smoothly performed.

The present invention has been made to solve the conventional problem previously mentioned, and has an object to provide a transfer device which can smoothly switch the two-wheel drive state and the four-wheel drive state.

Solution to Problem

In order to achieve the previously mentioned object, the transfer device according to the present invention to be mounted on a four-wheel drive vehicle capable of selectively switching a two-wheel drive state or a four-wheel drive state to distribute and output power outputted from a drive power source to main drive wheels and auxiliary drive wheels, the transfer device comprising: a center differential having a differential mechanism including one output member connected with the main drive wheels, a transmission member connected with the auxiliary drive wheels, and the other output member disposed between the one output member and the transmission member to be able to transmit the power from the one output member to the transmission member, and a differential case connected with the drive power source, a sleeve movable between a first position where the differential case and the other output member are engaged with each other and a second position where the other output member and the transmission member are engaged with each other, and a clutch that allows the one output member and the transmission member to be selectively engaged with or disengaged from each other.

By the construction as set forth in the above, the transfer device according to the present invention is operative to have the sleeve moved to the first position, thereby causing the differential case and the other output member to be engaged with each other, and thereby causing the other output member and the transmission member to be brought into non-transmission state. This makes it possible to have the four-wheel drive vehicle switched to the two-wheel drive state. Further, the movement of the sleeve to the second position has the other output member and the transmission member engaged with each other, thereby making it possible to have the four-wheel drive vehicle switched to the four-wheel drive state.

Further, the transfer device according to the present invention is provided with a clutch which can allow the one output member and the transmission member to selectively be engaged with and disengaged from each other. For this reason, the transfer device according to the present invention is operative to have the clutch engaged for the switching operation of the two-wheel drive state and the four-wheel drive state, thereby making it possible to have the other output member and the transmission member brought into direct connection state prior to the movement of the sleeve. The transfer device according to the present invention can smoothly switch the two-wheel drive state and the four-wheel drive state without the sleeve being difficult to move by the circulating torque generated from the tire diameter difference of the main drive wheels and the auxiliary drive wheels at the time of the switching operation of the two-wheel drive state and the four-wheel drive state.

The transfer device according to the present invention as defined in the above may further comprise: an auxiliary drive wheel drive member that transmits the power between the transmission member and the auxiliary drive wheels, and an intermittent unit selectively switchable to a transmission state in which the power is transmitted between the auxiliary drive wheel drive member and the auxiliary drive wheels or a non-transmission state in which the power is not transmitted between the auxiliary drive wheel drive member and the auxiliary drive wheels.

By the construction as set forth in the above, the transfer device according to the present invention is provided with the intermittent unit selectively switchable to the transmission state or the non-transmission state, thereby making it possible to have the power between the auxiliary drive wheels drive member and the auxiliary drive wheels cut off by the intermittent unit in the two-wheel drive state. This makes it possible to stop the operation of the auxiliary drive wheels drive member, and thus to enhance the fuel efficiency.

The transfer device according to the present invention as defined in the above, may preferably further comprises: a control unit that controls the movement of the sleeve, and the engagement and disengagement of the clutch, the control unit being operative to move the sleeve after the clutch is engaged when the two-wheel drive state or the four-wheel drive state is selectively switched, and to release the clutch after the sleeve is moved to the first position or the second position.

By the construction as set forth in the above, the transfer device according to the present invention can smoothly switch the two-wheel drive state and the four-wheel drive state.

In the transfer device according to the present invention as defined in the above, the control unit may be operative to control the engagement force of the clutch to synchronize the rotation of the auxiliary drive wheels and the rotation of the auxiliary drive wheel drive member when the vehicle is switched from the two-wheel drive state to the four-wheel drive state, and to control the intermittent unit to be switched to the transmission state after the synchronization of the rotation of the auxiliary drive wheels and the rotation of the auxiliary drive wheel drive member is completed.

By the construction as set forth in the above, the transfer device according to the present invention is operative to control the engagement force of the clutch, so that the intermittent unit is switched to the transmission state after the synchronization of the rotation of the auxiliary drive wheels and the rotation of the auxiliary drive wheels drive member is completed, thereby making it possible to smoothly perform a switching of the intermittent unit.

Advantageous Effects of Invention

The present invention can provide a transfer device which can smoothly switch the two-wheel drive state and the four-wheel drive state.

DESCRIPTION OF EMBODIMENTS

The preferred embodiment according to the present invention will hereinafter be described with reference to the accompanying drawings.

With reference to FIGS. 1 to 7, the explanation will be made about a four-wheel drive vehicle 1 to which is applied a transfer device 4 according to the embodiment of the present invention.

Figure 1:
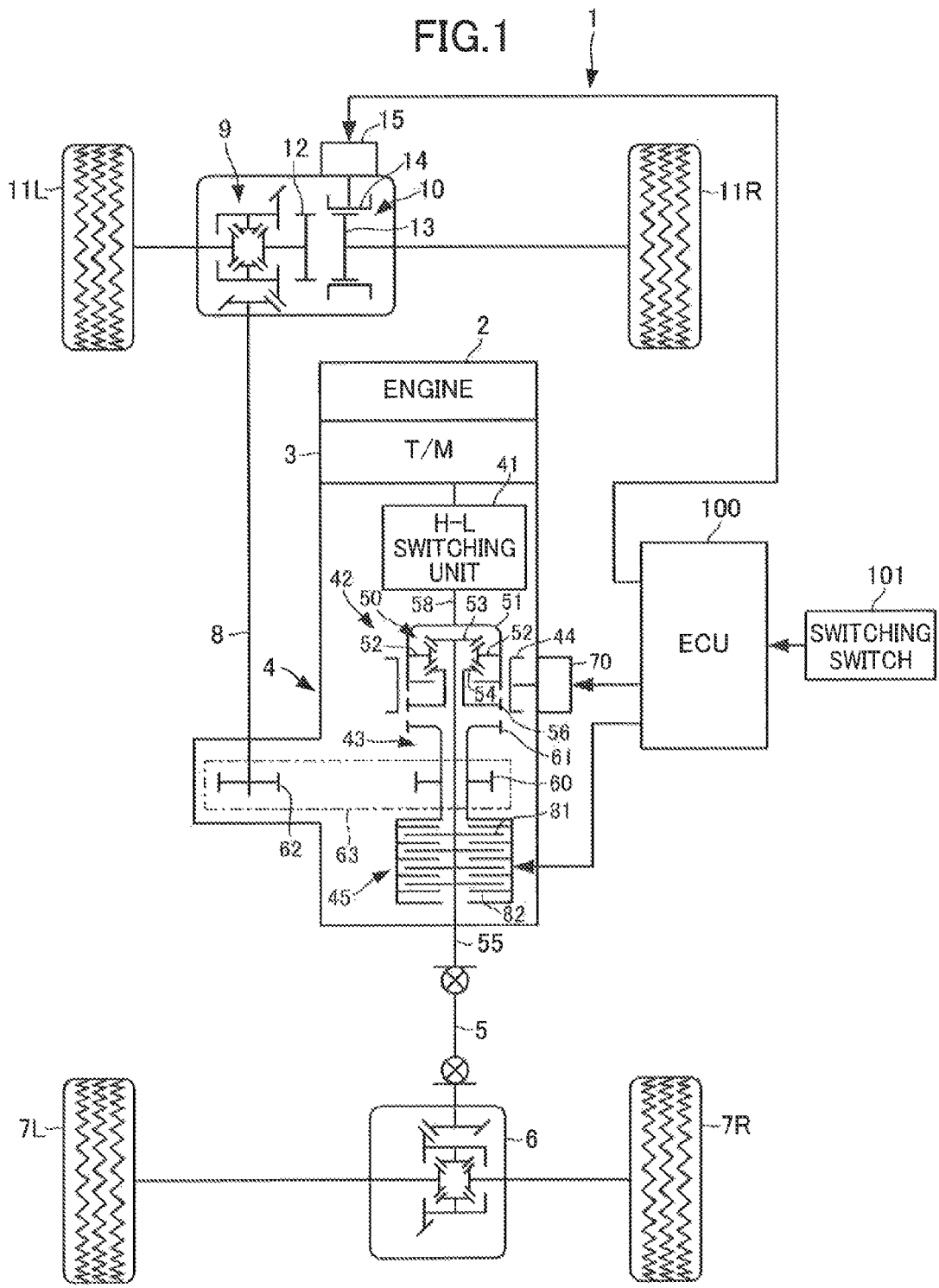
FIG. 1 is a schematic construction view schematically showing the construction of the four-wheel drive vehicle according to the embodiment of the present invention.

As shown in FIG. 1, the four-wheel drive vehicle 1 is constituted by a front engine-rear drive (FR drive), and is a four-wheel drive vehicle 1 which can selectively switch the two-wheel drive state or the four-wheel drive state. The four-wheel drive vehicle 1 is constructed to include an engine 2 serving as a drive power source, a transmission (T/M) 3, the transfer device 4, a rear propeller shaft 5, a rear differential 6, left and right rear wheels 7L, 7R, a front propeller shaft 8, a front differential 9, an intermittent unit 10, and left and right front wheels 11L, 11R.

The present embodiment will be explained with the rear wheels 7L, 7R constituting main drive wheels, respectively, to which the power from the engine 2 is directly transmitted, and with the front wheels 11L, 11R constituting auxiliary drive wheels, respectively, to which the power from the engine 2 is transmitted through the transfer device 4. Further, the two-wheel drive state includes a two-wheel drive mode in which the power from the engine 2 is transmitted only to the rear wheels 7L, 7R, and a standby four-wheel drive mode in which the power from the engine 2 is transmitted to the front wheels 11L, 11R if necessary by controlling a control clutch 45 hereinafter described while the power from the engine 2 is being transmitted to the rear wheels 7L, 7R. Further, the four-wheel drive state is indicative of a full-time four-wheel drive mode in which the power from the engine 2 is ordinarily transmitted to the rear wheels 7L, 7R and the front wheels 11L, 11R.

The engine 2 is constituted by a known power apparatus which can generate the power by burning gaseous mixture of fuel such as gasoline and the like and air in a combustion chamber not shown in the drawings to output the power to a crank shaft also not shown in the drawings. The engine 2 may be a diesel engine which can generate the power by using light oil and the like as fuel.

The transmission 3 is provided between the engine 2 and the transfer device 4 and is adapted to change the rotational speed of the engine 2 in accordance with a desired transmission ratio, and to output the rotation to the transfer device 4. The transmission 3 may be constituted by a stepped type of automatic transmission (planetary gear type) which can set gear stages by using for example friction engagement devices including clutches, brakes and the like, and planetary gear devices, a belt type of continuously variable transmission "CVT" to continuously adjust the transmission ratio, and a manual transmission for manually carrying out the speed change operation in response to the shift operation by a driver. The manual transmission may be constituted by an automatic manual transmission which is so called "AMT" for automatically performing the speed change operation with the aid of shift actuators and select actuators. In the case that the manual transmission is used, a clutch mechanism is provided between the engine 2 and the transmission 3.

The transfer device 4 is constructed to include an H-L switching unit 41, a center differential 42, a transmission mechanism 43, a switching sleeve 44, a control clutch 45, an actuator 70, an electronic control unit (hereinafter simply referred to as a "ECU") 100. The transfer device 4 is constructed to be able to distribute and output the power outputted from the engine 2 to the front wheels 11L, 11R and the rear wheels 7L, 7R.

The H-L switching unit 41 functions as an auxiliary transmission capable of performing a range shift operation between the ranges including a high speed range (Hi), a neutral range (N), and a low speed range (Lo). The H-L switching unit 41 is operative to select the high speed range (Hi) to ensure a high speed travel while the vehicle 1 is travelling on the paved road, while to select the low speed range (Lo) to ensure a large drive power to the drive wheels while the vehicle 1 is uphill travelling on the off-road to raise an accomplishment of a rough road. The H-L switching unit 41 is adapted to be able to selectively switch the high speed range or the low speed range for example by the operation of actuators in response to the driver's operation of a range shift lever and a range shift switch provided in the vicinity of a driver's seat in a passenger room.

The center differential 42 is adapted to allow the rotational difference of the front wheels 11L, 11R and the rear wheels 7L, 7R while the vehicle 1 is travelling in the four-wheel drive mode, and thus is constructed to include a differential mechanism 50 and a differential case 51.

The differential mechanism 50 has a pair of differential pinion gears 52, and a pair of side gears 53, 54. The differential pinion gears 52 are provided to be revolvable with respect to the differential case 51 and to be rotatable on its own axis. The differential pinion gears 52 are held in mesh with the pair of side gear 53, 54.

The one side gear 53, which is one of a pair of side gears 53, 54, is connected with a rear wheel output shaft 55 which is in turn connected with the rear wheels 7L, 7R through the propeller shaft 5 and the rear differential 6. The one side gear 53 and the rear wheel output shaft 55 collectively constitute one output member as defined in the present invention.

The side gear 54 is connected with a hub 56 which is in turn constructed to be able to transmit the power to the transmission mechanism 43 connected with the front wheels 11L, 11R. The hub 56 has an outer peripheral portion formed with a spline outer teeth not shown engageable with spline inner teeth of the switching sleeve 44 which will become apparent as the description proceeds. The side gear 54 and the hub 56 collectively constitute the other output member as defined in the present invention.

The differential case 51 is connected through the H-L switching unit 41 with an input shaft 58 connected with the transmission 3. This means that the differential case 51 is connected with the engine 2 through the input shaft 58 and the transmission 3. Further, the differential case 51 has an outer peripheral portion formed with spline outer teeth not shown but engageable with the spline inner teeth of the switching sleeve 44 hereinafter described in a similar manner to the hub 56. Further, in the differential case 51 is accommodated the pair of differential pinion gears 52 and the pair of side gears 53, 54.

The transmission mechanism 43 has a drive gear 60, a spline piece 61, a driven gear 62, and a chain 63.

The drive gear 60 is connected with the driven gear 62 through the chain 63. The spline piece 61 is connected with the drive gear 60 and thus rotatable integrally with the drive gear 60. The spline piece 61 has an outer peripheral portion formed with spline outer teeth not shown but engageable with the spline inner teeth of the switching sleeve 44 hereinafter described in a similar manner to the differential case 51 and the hub 56. The spline piece 61 in the present embodiment constitutes a transmission member as defined in the present invention.

The driven gear 62 is secured to one end of the front propeller shaft 8. The chain 63 is adapted to transmit the power of the engine 2, which is transmitted to the drive gear 60, to the driven gear 62 when the vehicle 1 is travelling in the four-wheel drive mode.

The switching sleeve 44 is formed in a cylindrical shape, and has an inner peripheral portion formed with spline inner teeth engageable with the spline outer teeth of the aforementioned deferential case 51, the hub 56 and the spline piece 61. The switching sleeve 44 is constructed to be movable in the axial direction of the rear wheel output shaft 55 by the actuator 70 between a first position where the differential case 51 and the hub 56 are engaged with each other by the switching sleeve 44, and a second position where the hub 56 and the spline piece 61 are engaged with each other by the switching sleeve 44. The switching sleeve 44 in the present embodiment constitutes a sleeve as defined in the present invention.

At the first position of the switching sleeve 44, the spline inner teeth of the switching sleeve 44 is engaged with the spline outer teeth of the differential case 51 and the hub 56, and is not engaged with the spline outer teeth of the spline piece 61, thereby establishing a two-wheel drive mode in which the power of the engine 2 is transmitted only to the rear wheels 7L, 7R and a standby four-wheel drive mode in which the power of the engine 2 is transmitted to the rear wheels 7L, 7R and the front wheels 11L, 11R through the control clutch 45.

At the second position of the switching sleeve 44, the spline inner teeth of the switching sleeve 44 are engaged with the spline outer teeth of the hub 56 and the spline piece 61, thereby establishing a full-time four-wheel drive mode in which the power of the engine 2 is transmitted to the rear wheels 7L, 7R and the front wheels 11L, 11R through the center differential 42.

The actuator 70 is connected with an ECU 100, so that the switching sleeve 44 can be moved by the actuator 70 in response to dive signals from the ECU 100. In the passenger room of the four-wheel drive vehicle 1 is provided a switching switch 101 that can selectively switch the two-wheel drive mode, the standby four-wheel drive mode, or the full-time four-wheel drive mode. The switching switch 101 is connected with the ECU 100, so that the ECU 100 can output drive signals responsive to the two-wheel drive mode, the standby four-wheel drive mode, or the full-time four-wheel drive mode. This means that the actuator 70 can be operated to have the switching sleeve 44 moved selectively to the first position or the second position in response to the drive signals of the previously mentioned drive modes from the ECU 100. Here, the switching switch 101 can be replaced with a switching lever.

The actuator 70 may be constituted by a rack-and-pinion mechanism having for example a rack and a pinion meshed with each other, and an electric motor connected with the pinion. The actuator 70 in the present embodiment is operative to have the pinion rotated by the electric motor, so that the rack can be reciprocally moved. The electric motor is controlled by the ECU 100. The switching sleeve 44 is axially moved together with the rack.

The control clutch 45 is connected with the transmission mechanism 43, and adapted to have the rear wheel output shaft 55 and the transmission mechanism 43 selectively engaged with or disengaged from each other. The control clutch 45 has a plurality of friction discs 81 rotated integrally with the rear wheel output shaft 55, and a plurality of friction plates 82 rotated integrally with the spline piece 61. This means that the control clutch 45 is what is called a multiple-disc clutch. Further, the control clutch 45 is connected with the ECU 100, so that a pressing torque that is pressing the friction disc 81 and the friction plate 82 is controlled by the ECU 100, thereby making it possible to adjust the clutch transmission torque between the rear wheel output shaft 55 and the transmission mechanism 43. This means that the ratio of the torque to be distributed to the front wheels 11L, 11R and the rear wheels 7L, 7R is variable.

The control clutch 45 may be replaced by any constructed device if the control clutch 45 is electrically controlled by the ECU 100. For example, the control clutch 45 may be replaced by various kinds of constructed device such as those to which is applied a pressing torque by using an actuator of an electric motor and the like, and those to which applied a pressing torque by an electro-magnet and oil pressure.

Further, the control clutch 45 may be operative to have the rear wheel output shaft 55 and the transmission mechanism 43 brought into a direct connection state by maximizing the clutch transmission torque when the vehicle 1 is travelling for example in the full-time four-wheel drive mode. In this case, the center differential 42 is in the differential lock state. Further, the control clutch 45 may be operative to have the clutch transmission torque adjusted and to limit the differential state when the vehicle 1 is travelling in the full-time four-wheel drive mode, thereby making it possible to allow the center differential 42 to function as a limit slip differential (hereinafter simply referred to as "LSD").

The control clutch 45 can realize the standby four-wheel drive mode by adjusting the clutch transmission torque in response to the travelling state of the four-wheel drive vehicle 1 for example when the switching sleeve 44 is positioned at the first position, viz., when the two-wheel drive mode is selected.

Further, the control clutch 45 can adjust the clutch transmission torque when the control clutch 45 is transferred to the standby four-wheel drive mode from the two-wheel drive mode in which the power transmission between the front wheels 11L, 11R and the front propeller shaft 8 is disconnected from each other by an intermittent unit 10 hereinafter described, so that the control clutch 45 can function as a synchronization unit that performs a synchronization in the intermittent unit 10. The synchronization of the intermittent unit 10 is intended to mean that the rotational difference between a first hub 12 and a second hub 13 hereinafter described is gradually reduced, and finally to almost zero. The control clutch 45 in the present embodiment constitutes a clutch as defined in the present invention.

The ECU 100 is constructed to include a microcomputer provided with for example CPU, RAM, ROM, input/output interfaces, and the like. The CPU is adapted to use a temporal memorization function of the RAM and to process signals in accordance with programs preliminarily memorized in the ROM. The ROM is memorized with programs regarding the drive state switching control hereinafter described and various kinds of programs needed for the control of the four-wheel drive vehicle 1. The ECU 100 in the present embodiment constitutes a control unit as defined in the present invention.

The ECU 100 is adapted to control the movement of the switching sleeve 44 through the actuator 70 and the engagement and disengagement of the control clutch 45. Further, the ECU 100 is adapted to control the engagement force, i.e., the clutch transmission torque of the control clutch 45 to synchronize the rotations of the front wheels 11L, 11R and the rotation of the front propeller shaft 8, viz., the rotation of the first hub 12 and the rotation of the second hub 13 hereinafter described when the switching operation is performed from the two-wheel drive mode to the full-time four-wheel drive mode.

Further, the ECU 100 is adapted to control the movement of an intermittent sleeve 14 through an actuator 15. In particular, the ECU 100 is adapted to move the intermittent sleeve 14 to its transmission state to have the intermittent unit 10 take the transmission state after the previously mentioned synchronization is completed.

The rear propeller shaft 5 is provided between the rear wheel output shaft 55 and the rear differential 6 to transmit the power outputted from the transfer device 4 to the rear wheels 7L, 7R through the rear differential 6.

The rear differential 6 is provided between the rear propeller shaft 5 and the left and right rear wheels 7L, 7R to allow the rotational difference between the left and right rear wheels 7L, 7R.

The front propeller shaft 8 is provided between transfer device 4, more particularly the transmission mechanism 43, and the front differential 9 to transmit the power outputted from the transfer device 4 to the left and right front wheels 11L, 11R through the front differential 9. This means that the front propeller shaft 8 is adapted to transmit the power between the transmission mechanism 43 and the left and right front wheels 11L, 11R. The front propeller shaft 8 in the present embodiment constitutes an auxiliary drive wheels drive member as defined in the present invention.

The front differential 9 is disposed between the front propeller shaft 8 and the left and right front wheels 11L, 11R to allow the rotational difference between the left and right front wheels 11L, 11R.

The intermittent unit 10 is disposed between the front differential 9 and the front wheel 11R. The intermittent unit 10 is constructed to selectively take a transmission state in which the power is transmitted between the front propeller shaft 8 and the left and right front wheels 11L, 11R or a non-transmission state in which the power is not transmitted between the front propeller shaft 8 and the left and right front wheels 11L, 11R. More specifically, the intermittent unit 10 comprises the first hub 12 connected with the front differential 9, the second hub 13 connected with the front wheel 11R, the intermittent sleeve 14 that can be engaged with the first hub 12 and the second hub 13, and the actuator 15. The first hub 12 and the second hub 13 respectively have outer peripheral portions formed with respective the spline outer teeth, while the intermittent sleeve 14 has an inner peripheral portion formed with the spline inner teeth which are engageable with the spline outer teeth of the first hub 12 and the second hub 13. The actuator 15 is connected with the ECU 100, and thus is adapted to have the intermittent sleeve 14 be axially movable in response to the drive signal from the ECU 100. The actuator 15 to be used can be in a type the same as the aforementioned actuator 70.

The intermittent unit 10 is operative to move the intermittent sleeve 14 to a transmission position at which the intermittent sleeve 14 is engaged with the both of the first hub 12 and the second hub 13, so that the intermittent unit 10 is in a transmission state in which the power is transmitted between the front propeller shaft 8 and the left and right front wheels 11L, 11R. On the other hand, the intermittent unit 10 is operative to move the intermittent sleeve 14 to a non-transmission position at which the intermittent sleeve 14 is engaged with only either one of the first hub 12 and the second hub 13 (in the present embodiment, the intermittent sleeve 14 is engaged with the second hub 13 only), so that the intermittent unit 10 is in the non-transmission state in which the power is not transmitted between the front propeller shaft 8 and the left and right front wheels 11L, 11R. The intermittent unit 10 in the present embodiment constitutes an intermittent unit as defined in the present invention.

Next, the explanation will be made about the drive state switching control in the transfer device 4 according to the present embodiment with reference to FIGS. 2 to 7.

First, the explanation will be made about the drive state switching control from the standby four-wheel drive mode to the full-time four-wheel drive mode in the transfer device 4 according to the present embodiment.

Figure 2:
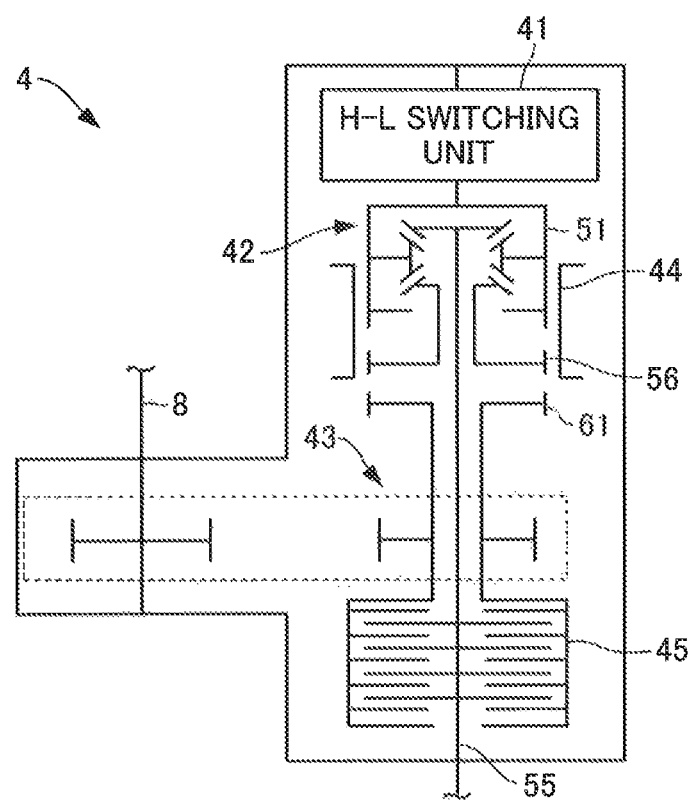
FIG. 2 is an explanation view for explaining the operation of the transfer device according to the embodiment of the present invention, and a schematic view of the transfer device showing a standby four-wheel drive mode.
Figure 5:
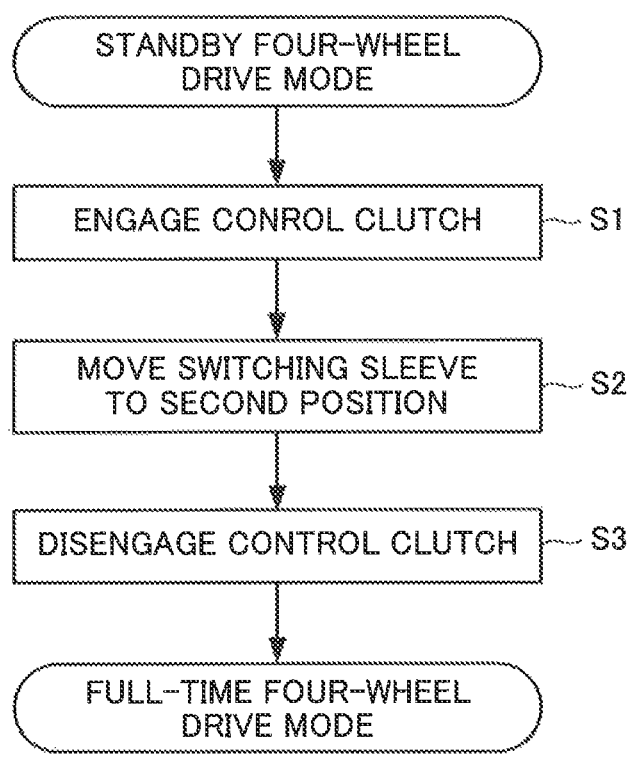
FIG. 5 is a flow chart showing a drive state switching control to the full-time four-wheel drive mode from the standby four-wheel drive mode to be executed by an ECU according to the embodiment of the present invention.

As shown in FIG. 5, the ECU 100 is operated to have the control clutch 45 brought into the direct connection state in which the control clutch 45 is in the engaged state, viz., the clutch transmission torque is maximized when the switching switch 101 (see FIG. 1) is pressed by the driver to have the ECU 100 inputted with the signal showing the need of the full-time four-wheel drive mode during the standby four-wheel drive mode of the ECU 100 (Step S1). As shown in FIG. 2, the transfer device 4 is thereby operated to have the rotational speeds of the rear wheel output shaft 55 and the transmission mechanism 43 equal to each other, so that the load applied on the switching sleeve 44 through the differential case 51, the hub 56 and the spline piece 61 becomes only the engine torque of the engine 2 (see FIG. 1).

Figure 3:
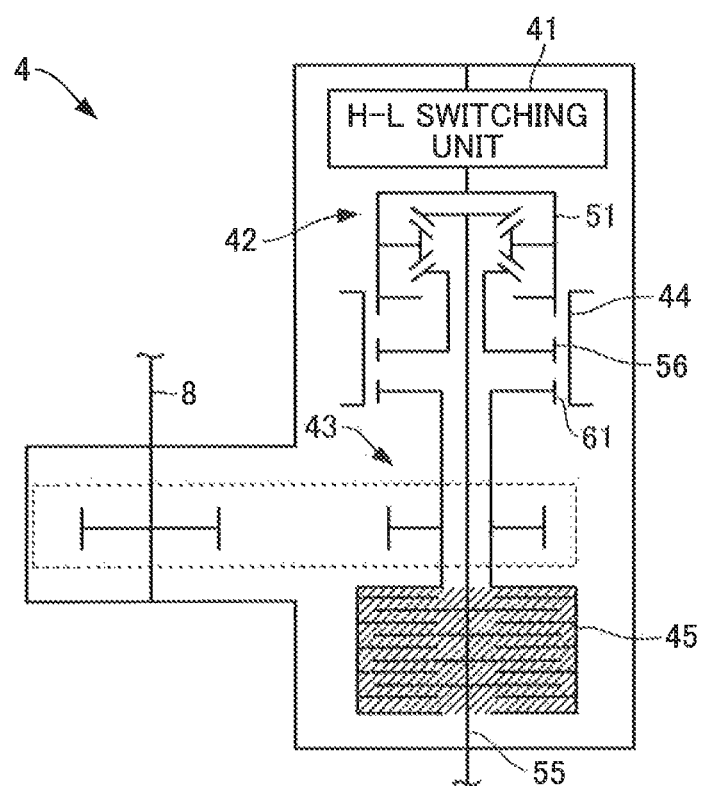
FIG. 3 is an explanation view for explaining the operation of the transfer device according to the embodiment of the present invention, and a schematic view of the transfer device in a differential lock state.
Figure 4:
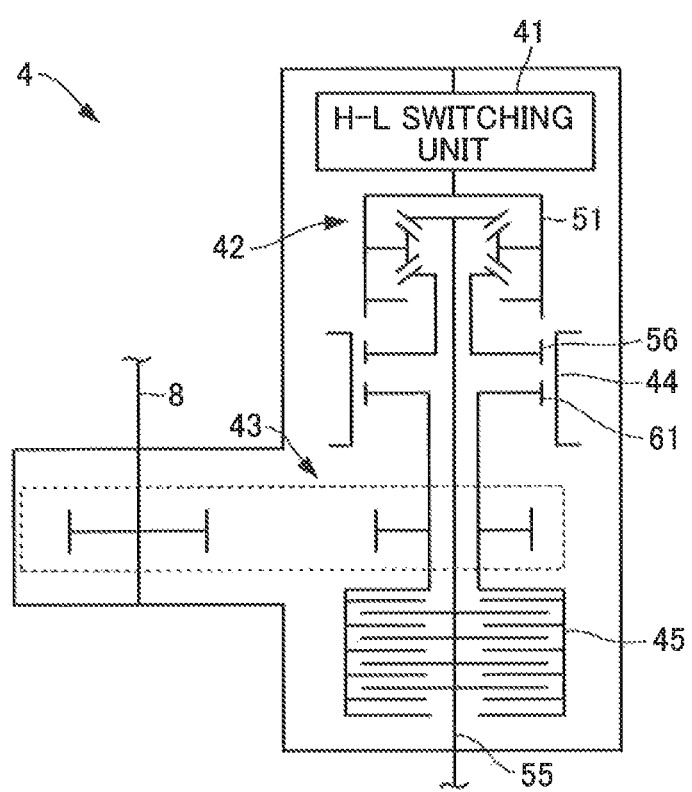
FIG. 4 is an explanation view for explaining the operation of the transfer device according to the embodiment of the present invention, and a schematic view of the transfer device in a full-time four-wheel drive mode.

Next, the ECU 100 outputs the drive signal to the actuator 70 to move the switching sleeve 44 from the first position shown in FIG. 2 to the second position shown in FIG. 4 (Step S2). At this time, the switching sleeve 44 is, as shown in FIG. 3, moved by way of the differential lock state in which the switching sleeve 44 is engaged with all of the differential case 51, the hub 56 and the spline piece 61. Even if the switching sleeve 44 is, however, in the differential lock state, the control clutch 45 is engaged as previously described, so that the input of the circulating torque to the switching sleeve 44 is in the non-transmission. This means that the load applied on the switching sleeve 44 becomes only the engine torque. The switching sleeve 44 can therefore be smoothly moved to the second position with no effect of the circulating torque as seen in the conventional apparatus even if the switching sleeve 44 is moved by way of the differential lock state. Here, the diagonal lines drawn on the control clutch 45 shown in FIG. 3 indicates the engagement state of the control clutch 45.

Next, the ECU 100 is operated to move the switching sleeve 44 to the second position as shown in FIG. 4, and thereafter to disengage the control clutch 45, viz., to minimum or zero the clutch transmission torque (Step S3). Through this process, the switching operation from the standby four-wheel drive mode to the full-time four-wheel drive mode is completed.

Next, the explanation will be made about the drive state switching control from the full-time four-wheel drive mode to the standby four-wheel drive mode in the transfer device 4 according to the present embodiment.

Figure 6:
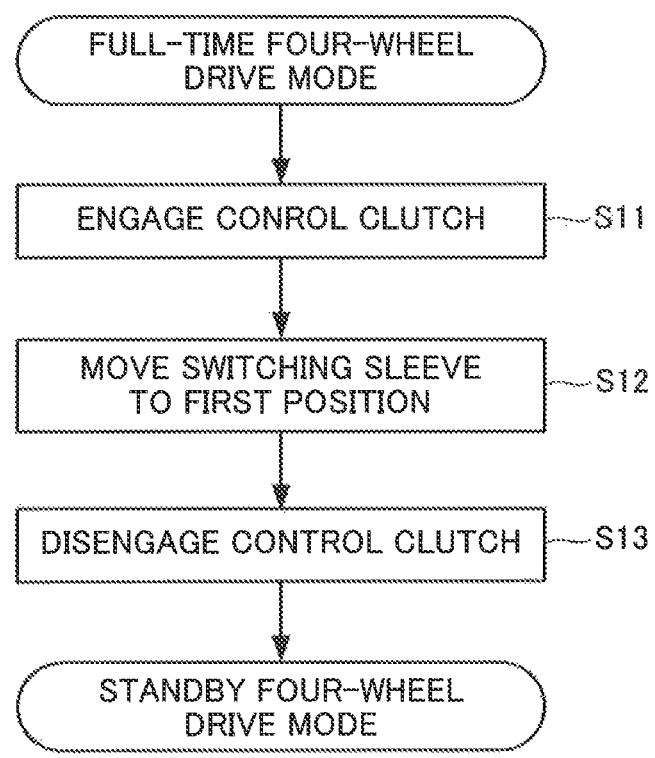
FIG. 6 is a flow chart showing a drive state switching control to the standby four-wheel drive mode from the full-time four-wheel drive mode to be executed by the ECU according to the embodiment of the present invention.

As shown in FIG. 6, the ECU 100 is operated to have the control clutch 45 brought into the direct connection state in which the control clutch 45 is in the engaged state, viz., the clutch transmission torque is maximized when the switching switch 101 (see FIG. 1) is pressed by the driver to have the ECU 100 inputted with the signal showing the need of the standby four-wheel drive mode during the full-time four-wheel drive mode of the ECU 100 (Step S11). As shown in FIG. 4, the transfer device 4 is thereby operated to have the rotational speeds of the rear wheel output shaft 55 and the transmission mechanism 43 equal to each other, so that the load applied on the switching sleeve 44 through the differential case 51, the hub 56 and the spline piece 61 becomes only the engine torque of the engine 2 (see FIG. 1).

Then, the ECU 100 outputs the drive signal to the actuator 70 to move the switching sleeve 44 from the second position shown in FIG. 4 to the first position shown in FIG. 2 (Step S12). At this time, the switching sleeve 44 is, as shown in FIG. 3, moved by way of the differential lock state in which the switching sleeve 44 is engaged with all of the differential case 51, the hub 56 and the spline piece 61. Even if the switching sleeve 44 is, however, in the differential lock state, the control clutch 45 is engaged as previously described, so that the input of the circulating torque to the switching sleeve 44 is in the non-transmission. This means that the load applied on the switching sleeve 44 is only the engine torque. The switching sleeve 44 can therefore be smoothly moved to the first position with no effect of the circulating torque as seen in the conventional apparatus even if the switching sleeve 44 is moved by way of the differential lock state.

Then, the ECU 100 is operated to move the switching sleeve 44 to the first position as shown in FIG. 2, and thereafter to disengage the control clutch 45, viz., to minimum or zero the clutch transmission torque (Step S13). Through this process, the switching operation from the full-time four-wheel drive mode to the standby four-wheel drive mode is completed.

As will be understood from the foregoing description, the ECU 100 in the present embodiment is operated to move the switching sleeve 44 after the control clutch 45 is engaged for the switching operation of the full-time four-wheel drive mode and the standby four-wheel drive mode, as well as to disengage the control clutch 45 after the switching sleeve 44 is moved to the first position or the second position. This means that the transfer device 4 according to the present embodiment can smoothly perform the switching operation of the full-time four-wheel drive mode and the standby four-wheel drive mode.

Next, the explanation will be made about the drive state switching control from the two-wheel drive mode to the standby four-wheel drive mode in the transfer device 4 according to the present embodiment.

Figure 7:
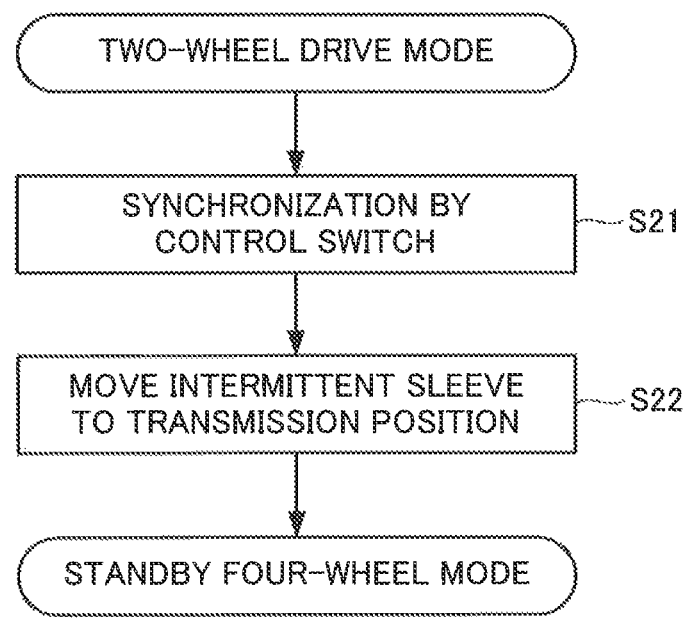
FIG. 7 is a flow chart showing a drive state switching control to the standby four-wheel drive mode from the two-wheel drive mode to be executed by the ECU according to the embodiment of the present invention.

As shown in FIG. 7, the ECU 100 is operated to have the control clutch 45 operated to synchronize the rotations of the front wheels 11L, 11R and the rotation of the front propeller shaft 8 when the switching switch 101 (see FIG. 1) is pressed by the driver to have the ECU 100 inputted with the signal showing the need of the standby four-wheel drive mode during the two-wheel drive mode of the ECU 100 (Step S21). More specifically, the ECU 100 is operated to gradually raise the clutch transmission torque of the control clutch 45, thereby rotating the front propeller shaft 8 (see FIG. 1) which is being stopped. This makes it possible to synchronize the rotation of the first hub 12 and the rotation of the second hub 13. The synchronization of the rotation of the first hub 12 and the rotation of the second hub 13 makes it possible to smoothly move the intermittent sleeve 14, and to suppress the shocks caused when the intermittent unit 10 is switched from the non-transmission to the transmission state.

Next, the ECU 100 outputs the drive signal to the actuator 15 (see FIG. 1) to move the intermittent sleeve 14 from the cut-off position to the transmission position (Step S22). Through this process, the switching operation from the two-wheel drive mode to the standby four-wheel drive mode is completed.

As has been described, the transfer device 4 according to the present embodiment is operated to move the switching sleeve 44 to the first position, thereby having the differential case 51 and the hub 56 engaged with each other and having the hub 56 and the spline piece 61 brought into the non-transmission state. This makes it possible to have the four-wheel drive vehicle 1 switched to the two-wheel drive mode or the standby four-wheel drive mode. Further, the movement of the switching sleeve 44 to the second position has the hub 56 and the spline piece 61 engaged with each other. This makes it possible to have the four-wheel drive vehicle 1 take the full-time four-wheel drive mode.

Further, the transfer device 4 according to the present embodiment is provided with the control clutch 45 which can engage and disengage the rear wheel output shaft 55 and the spline piece 61. For this reason, the transfer device 4 according to the present embodiment can bring the hub 56 and the spline piece 61 into the direct connection state prior to the movement of the switching sleeve 44 by the engagement of the control clutch 45 when the switching operation is carried out to switch the two-wheel drive mode or the standby four-wheel drive mode and the full-time four-wheel drive mode. The transfer device 4 according to the present embodiment can smoothly perform the switching operation to switch the two-wheel drive mode or the standby four-wheel drive mode and the full-time four-wheel drive mode with no difficulties to move the switching sleeve 44 by the circulating torque when the switching operation is performed to switch the two-wheel drive mode or the standby four-wheel drive mode and the full-time four-wheel drive mode.

Further, the transfer device 4 according to the present embodiment is provided with the intermittent unit 10 capable of switching the transmission state and the non-transmission, thereby making it possible to cut off the power between the front propeller shaft 8 and the front wheels 11L, 11R by the intermittent unit 10 in the two-wheel drive mode. This makes it possible to stop the driving (rotation) of the front propeller shaft 8 in the two-wheel drive mode, so that the fuel efficiency can be enhanced.

Further, the transfer device 4 according to the present embodiment is operated to have the ECU 100 control the engagement force, i.e., the clutch transmission torque of the switching sleeve 44, thereby making it possible to smoothly perform the switching operation of the intermittent unit 10 since the intermittent unit 10 is switched to the transmission state after the synchronization of the rotations of the front wheels 11L, 11R and the rotation of the front propeller shaft 8 is completed.

Further, the transfer device 4 according to the present embodiment is provided with the control clutch 45, thereby making it possible to realize the two-wheel drive mode, the standby four-wheel drive mode, and the full-time four-wheel drive mode, and to smoothly perform the transfer of the these modes. This makes it possible to enhance the fuel efficiency while securing the traction performance. For example when the vehicle 1 is running on the paved road having a relatively high road friction coefficient, the torque distribution to the rear wheels 7L, 7R can be increased in the standby four-wheel drive mode, thereby making it possible to enhance the turning performance. On one hand, in the case that the vehicle 1 is running on the off-road requiring a relatively large traction, the control clutch 45 functions as a LSD for the full-time four-wheel drive mode, thereby making it possible to enhance the run-through performance. On the other hand, the intermittent unit 10 is maintained in the non-transmission in the standby four-wheel drive mode, thereby making it possible to enhance the fuel efficiency.

Further, the transfer device 4 according to the present embodiment can perform the synchronization operation of the intermittent unit 10 by the single control clutch 45 at the time of the switching operations of the standby four-wheel drive mode and the full-time four-wheel drive mode, and at the time of the switching operation from the standby four-wheel drive mode to the two-wheel drive mode. Therefore, the transfer device 4 can be mounted on the four-wheel drive vehicle 1 in a compact form.

The above embodiment has been explained raising an example in which the transfer device according to the present invention is applied to the four-wheel drive vehicle using an internal combustion engine such as an engine as a drive power source, however, the above embodiment may be applied to what is called a hybrid vehicle using both of an internal combustion engine and an electric motor.

From the foregoing description, it will understood that the transfer device according to the present invention has such an advantageous effect that the transfer device can smoothly switch the two-wheel drive state and the four-wheel drive state, and is effective for all of the transfer devices to be mounted on the four-wheel drive vehicle capable of switching the two-wheel drive state and the four-wheel drive state.

EXPLANATION OF REFERENCE NUMERALS

1 . . . four-wheel drive vehicle
2 . . . engine (drive power source)
4 . . . transfer device
7L, 7R . . . rear wheels (main drive wheels)
8 . . . front propeller shaft (auxiliary drive wheel drive member)
10 . . . intermittent unit
11L, 11R . . . front wheels (auxiliary drive wheels)
42 . . . center differential
43 . . . transmission mechanism
44 . . . switching sleeve (sleeve)
45 . . . control clutch (clutch)
50 . . . differential mechanism
51 . . . differential case
53 . . . one side gear (one output member)
54 . . . the other side gear (the other output member)
55 . . . rear wheel output shaft (one output member)
56 . . . hub (the other output member)
61 . . . piece (transmission member)
100 . . . ECU (control unit)

The invention claimed is:

1. A transfer device to be mounted on a four-wheel drive vehicle capable of selectively switching a two-wheel drive state or a four-wheel drive state to distribute and output power outputted from a drive power source to main drive wheels and auxiliary drive wheels, the transfer device comprising a center differential having a differential mechanism including one output member connected with the main drive wheels, a transmission member connected with the auxiliary drive wheels, and an other output member disposed between the one output member and the transmission member to be able to transmit the power from the one output member to the transmission member, and a differential case connected with the drive power source, a sleeve movable between a first position where only the differential case and the other output member are engaged with each other, a second position where only the other output member and the transmission member are engaged with each other, and a third position where only the differential case, the other output member, and the transmission member are engaged with each other, and a clutch that allows the one output member and the transmission member to be selectively engaged with or disengaged from each other.

2. The transfer device as defined in claim 1, which further comprises:
an auxiliary drive wheel drive member that transmits the power between the transmission member and the auxiliary drive wheels, and
an intermittent unit selectively switchable to a transmission state in which the power is transmitted between the auxiliary drive wheel drive member and the auxiliary drive wheels or a non-transmission state in which the power is not transmitted between the auxiliary drive wheel drive member and the auxiliary drive wheels.

3. The transfer device as defined in claim 1, which further comprises:
a control unit that controls the movement of the sleeve, and the engagement and disengagement of the clutch,
the control unit being operative to move the sleeve after the clutch is engaged when the two-wheel drive state or the four-wheel drive state is selectively switched, and to release the clutch after the sleeve is moved to the first position or the second position.

4. The transfer device as defined in claim 2, which further comprises:
a control unit that controls the movement of the sleeve, and the engagement and disengagement of the clutch, in which the control unit is operative to control the engagement force of the clutch to synchronize the rotation of the auxiliary drive wheels and the rotation of the auxiliary drive wheel drive member when the vehicle is switched from the two-wheel drive state to the four-wheel drive state, and to control the intermittent unit to be switched to the transmission state after the synchronization of the rotation of the auxiliary drive wheels and the rotation of the auxiliary drive wheel drive member is completed.

5. The transfer device as defined in claim 1, which further comprises:
an electronic control unit that is programmed to control the movement of the sleeve, and the engagement and disengagement of the clutch,
the electronic control unit being operative to move the sleeve after the clutch is engaged when the two-wheel drive state or the four-wheel drive state is selectively switched, and to release the clutch after the sleeve is moved to the first position or the second position.

6. The transfer device as defined in claim 2, which further comprises:
an electronic control unit that is programmed to control the movement of the sleeve, and the engagement and disengagement of the clutch, in which the electronic control unit is operative to control the engagement force of the clutch to synchronize the rotation of the auxiliary drive wheels and the rotation of the auxiliary drive wheel drive member when the vehicle is switched from the two-wheel drive state to the four-wheel drive state, and to control the intermittent unit to be switched to the transmission state after the synchronization of the rotation of the auxiliary drive wheels and the rotation of the auxiliary drive wheel drive member is completed.

7. The transfer device as defined in claim 1, in which the one output member is a first side gear, the other output member is a second side gear, the differential mechanism includes a pair of differential pinion gears, and the pair of differential pinion gears are held in mesh with the first side gear and the second side gear.

* * * * *